Patented Jan. 19, 1954

2,666,769

UNITED STATES PATENT OFFICE 2,666,769

17-GLYCOLYL-ESTRADIOLS

Frank B. Colton, Chicago, Ill., assignor to G. D. Searle & Co., Chicago, Ill., a corporation of Illinois No Drawing. Application September 27, 1952, Serial No. 311,945

3 Claims. (Cl. 260—397.4)

This invention relates to a new group of organic compounds and specifically to 17-glycolyl-estradiol and its 3-monoalkyl and aralkyl ethers. These compounds can be represented by the general structural formula

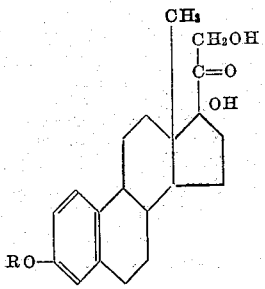

wherein R is hydrogen, a lower alkyl or a lower phenylalkyl radical. Among the radicals which R can represent are hydrogen, such lower alkyl radicals as methyl, ethyl, straight and branch chained propyl, butyl, amyl and hexyl, as well as lower phenylalkyl radicals such as benzyl and phenethyl.

The claimed compositions are of great value in providing medicinal agents which are effective in compensating gonadal and adrenocorticoid hormonal imbalance and in improving nitrogen anabolism in cases of insufficient nitrogen retention. It is a special advantage that these effects can be achieved without the serious side reactions observed with naturally occurring steroids. These compounds are of special utility as starting materials in a microbiological oxidation process leading to hydroxyl derivatives which are of value in the treatment of inflammatory diseases.

The following experimental part illustrates a convenient procedure for the practice of my invention and the compounds prepared thereby. However, the invention is not to be construed as limited in spirit or in scope by the details set forth. In these examples temperatures are indicated in degrees centigrade (° C.) and quantities in parts by weight.

Example 1

A stirred solution of 120 parts of 3-methoxy-$\Delta^{1,3,5}$-estratrien-17-one in 2600 parts of anhydrous toluene and 4300 parts of anhydrous ether is saturated with a slow stream of acetylene. In the course of 30 minutes there is added a solution of 120 parts of potassium tert. amylate in 2800 parts of anhydrous tert. pentanol. The passage of acetylene and stirring are continued for an additional 5 hours after which the reaction mixture is washed 5 times with 3000-part portions of saturated ammonium chloride solution and then with water. It is then dried over anhydrous sodium sulfate and concentrated to dryness under vacuum. The residue is recrystallized from methanol. The 3 - methoxy - 17 - ethynyl-$\Delta^{1,3,5}$-estratrien-17-ol thus obtained melts at about 143–146° C. A further recrystallization from acetone yields crystals melting at about 150–151° C. The compound has the structural formula

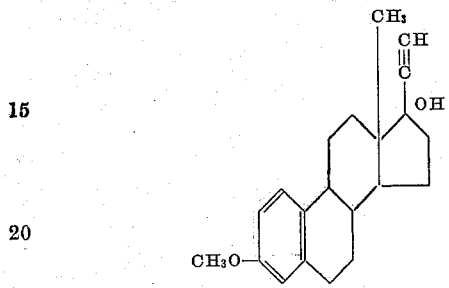

A solution of 36.5 parts of 3-methoxy-17-ethynyl-$\Delta^{1,3,5}$-estratrien-17-ol in 2000 parts of dioxane and 250 parts of pyridine is reduced in an atmosphere of hydrogen over 10 parts of a catalyst containing 5% palladium on calcium carbonate until one mole of hydrogen is absorbed. The catalyst is collected on a filter and the filtrate is taken to dryness under vacuum. Recrystallization of the residue from methanol yields the 3-methoxy-17-vinyl-$\Delta^{1,3,5}$-estratrien-17-ol which melts at about 114–115° C. and has the structural formula

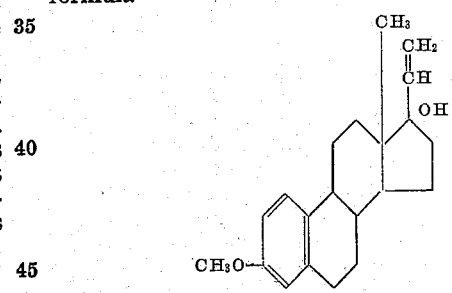

To a solution of 2.98 parts of phosphorus tribromide in 88 parts of anhydrous chloroform there is added a solution of 10 parts of 3-methoxy-17-vinyl-$\Delta^{1,3,5}$-estratrien-17-ol in 180 parts of chloroform and 12 parts of pyridine in the course of 2 hours while the temperature is maintained at −20° C. The resulting solution is permitted to reach room temperature. It is left standing for 12 hours. After addition of 300 parts of chloroform the reaction mixture is washed first with a 1% aqueous hydrogen chloride solution and then with water. After drying over sodium sulfate the solvent is removed under vacuum. The residue contains a mixture of 3-methoxy - 17 - (β-bromoethylidene)-$\Delta^{1,3,5}$-estratriene and some 3-methoxy-17-vinyl-$\Delta^{1,3,5,16}$-estratetraene. This mixture is heated at reflux temperature for 5 hours with 80 parts of freshly fused potassium acetate in 800 parts of anhydrous acetone and then filtered. The filtrate is taken to dryness on a steam bath with the aid of a current of nitrogen. The residue is extracted with 1000 parts of petroleum ether and the solvent removed under vacuum. The resulting residue is dissolved in benzene and applied to a chromatography column containing 300 parts of silica gel. The 3-methoxy-17-vinyl-$\Delta^{1,3,5,16}$-estratetraene is eluted with benzene. Crystallized from aqueous methanol it melts at about 84–86° C.; the ultraviolet absorption maximum of a methanolic solution shows a maximum at about 230 millimicrons with an extinction coefficient of 17,000 and a maximum at about 280 millimicrons with an extinction coefficient of 2,000. The 3-methoxy-17-(β-acetoxyethylidene) - $\Delta^{1,3,5}$ - estratriene is then eluted with a mixture containing 97 parts of benzene and 3 parts of ethyl acetate. Concentration of the eluate under vacuum and crystallization from methanol yields crystals melting at about 67–68° C. The compound has the structural formula

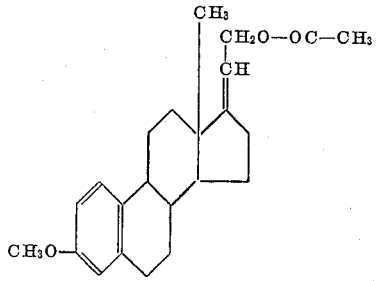

23.5 parts of this compound are dissolved in 315 parts of anhydrous tertiary butanol and treated with stirring with 71 parts of a 1.5 molar anhydrous solution of hydrogen peroxide in tertiary butanol and then with a solution of 0.45 part of osmium tetroxide in 45 parts of tertiary butanol. In the course of the following 36 hours a solution of 0.45 part of osmium tetroxide in 45 parts of tertiary butanol is added and, after standing at room temperature for 48 hours, the mixture is treated with water and the tertiary butanol is removed under vacuum. The material is extracted with chloroform and the extract is washed with water, dried over sodium sulfate, filtered and evaporated. The resulting residue is taken up in 1000 parts of methanol, treated with a solution of 15 parts of 85% sodium sulfite in 250 parts of water and heated at reflux temperature for 30 minutes. The reaction mixture is extracted with chloroform and the extract washed with water, dried over anhydrous sodium sulfate and evaporated in vacuo.

10 parts of the residue are taken up in a mixture of 900 parts of benzene and 100 parts of ethyl acetate and poured through a chromatography column containing 400 parts of silica gel. Elution with a 9:1 mixture of benzene and ethyl acetate yields an eluate which, on concentration under vacuum and on recrystallization from aqueous methanol, yields 3-methoxy-17-glycolyl-$\Delta^{1,3,5}$-estratien-17-ol melting at about 98–100° C. The compound has the structural formula

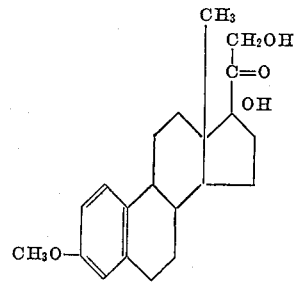

Further elution of the chromatography column with a mixture of 70 parts of benzene and 30 parts of ethyl acetate yields 3-methoxy-17-(α,β-dihydroxyethyl) - $\Delta^{1,3,5}$ - estratrien-17-ol which, crystallized from aqueous methanol, melts at about 147–150° C.

*Example 2*

A solution of 20 parts of 17-vinyl-$\Delta^{1,3,5}$-estratriene-3,17-diol in 350 parts of chloroform and 25 parts of pyridine is added in the course of 2 hours to a solution of 5.8 parts of phosphorus tribromide in 170 parts of anhydrous chloroform while the temperature is maintained at about −20° C. After standing at room temperature for 8 hours the reaction mixture is treated with an equal volume of chloroform, washed with dilute hydrochloric acid and then with water. The reaction mixture is then dried over sodium sulfate, filtered and solvent stripped. The residue is treated with 152 parts of freshly fused potassium acetate in 1500 parts of acetone, heated at reflux temperature for 5 hours and then filtered. The filtrate is heated on the steam bath and brought to dryness with the aid of a current of nitrogen. The residue is extracted with petroleum ether and the extract is brought to dryness under vacuum. The resulting residue is dissolved in benzene and poured into a chromatography column containing 550 parts of silica gel. The column is washed several times with benzene, after which the 17-(β-acetoxyethylidene)-$\Delta^{1,3,5}$-estratriene-3-ol is eluted with a mixture containing 92 parts of benzene and 8 parts of ethyl acetate. The eluate is concentrated in vacuo and crystallized from aqueous methanol. A stirred solution of 50 parts of this product in 650 parts of anhydrous tertiary pentanol is treated first with 157 parts of a 1.4 molar anhydrous solution of hydrogen peroxide in tertiary pentanol and then with a solution of 0.9 part of osmium tetroxide in 90 parts of tertiary pentanol. In the course of the subsequent 48 hours an additional quantity of 0.9 part of osmium tetroxide in 90 parts of tertiary pentanol is added. After standing at room temperature for 48 hours, the mixture is washed with water, the organic layer is separated and the tertiary pentanol is distilled off under vacuum. The residue is extracted with chloroform and the extract is dried over calcium sulfate, filtered and evaporated. This residue is dissolved in 2500 parts of methanol and treated with 30 parts of an 85% solution of sodium sulfite in 500 parts of water and heated at reflux temperature for an hour. The reaction mixture is then extracted with chloroform and the resulting extract is washed with water, dried over anhydrous calcium sulfate and taken to dryness under vacuum.

One part of the residue is taken up in a mixture of 90 parts of benzene and 10 parts of ethyl acetate and poured through a chromatography column containing 40 parts of silica gel. The column is eluted with a mixture containing 8 parts of benzene to 2 parts of ethyl acetate and the eluate is taken to dryness under vacuum. The residue contains 17-glycolylestradiol of the structural formula

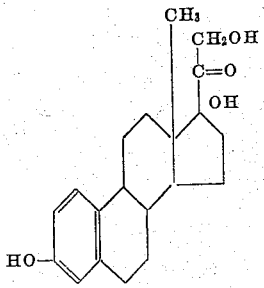

The ultraviolet absorption spectrum shows a maximum at about 280 millimicrons with an extinction coefficient of 2,000. The infrared spectrum shows a maximum at about 5.87 microns. The blue tetrazolium test gives a rapid positive reaction.

I claim:
1. A compound of the structural formula

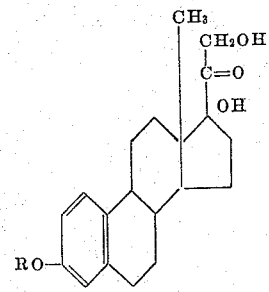

wherein R is a member of the class consisting of hydrogen and lower alkyl radicals.
2. 17-glycolylestradiol.
3. 3 - methoxy - 17 - glycolyl-$\Delta^{1,3,5}$-estratrien-17-ol.

FRANK B. COLTON.

No references cited.